(12) United States Patent
Vejraska

(10) Patent No.: US 6,424,117 B1
(45) Date of Patent: Jul. 23, 2002

(54) PRESS-IN CONTACT

(75) Inventor: Anthony P. Vejraska, Lincoln, NE (US)

(73) Assignee: Centurion Wireless Technologies, Inc., Lincoln, NE (US)

( * ) Notice: Subject to any disclaimer, the term of this patent is extended or adjusted under 35 U.S.C. 154(b) by 0 days.

(21) Appl. No.: 09/855,959

(22) Filed: May 15, 2001

(51) Int. Cl.[7] .............................................. H01M 10/46
(52) U.S. Cl. ..................................................... 320/112
(58) Field of Search ................................ 320/107, 112, 320/DIG. 26

(56) References Cited

U.S. PATENT DOCUMENTS

| 5,631,101 A | * | 5/1997 | Amero, Jr. |
| 5,761,792 A | * | 6/1998 | Alexandres et al |
| 6,175,624 B1 | * | 1/2001 | Brundieck et al. |
| 6,219,247 B1 | * | 4/2001 | Haupt et al. |

* cited by examiner

Primary Examiner—Edward H. Tso
(74) Attorney, Agent, or Firm—Thomte, Mazour & Niebergall; Dennis L. Thomte

(57) ABSTRACT

A press-in contact is disclosed for use in a battery pack including a plastic housing which is closed by a plastic cover. The plastic housing has a plurality of circular openings formed therein while the plastic cover is also provided with a plurality of circular openings formed therein. A press-in contact is inserted into each of the openings which have pre-described geometry. A circumferential barb is provided on the inner end of each of the press-in contacts and serves as a mechanical connection of the contact to the plastic housing or cover and also provides a watertight seal. The inner ends of the contacts are operatively connected to a flexible circuit board within the battery pack.

29 Claims, 3 Drawing Sheets

PRESS-IN CONTACT

BACKGROUND OF THE INVENTION

1. Field of the Invention

This invention relates to a press-in contact and more particularly to a press-in contact which is ideally suited for use in a battery pack which may be used on cellular telephones, two-way radios, etc.

2. Description of the Related Art

Battery packs for cellular telephones, two-way radios, and other equipment requiring a battery pack normally are encased in a plastic housing with the outer surface of the plastic housing of the battery pack normally including a plurality of charging contacts positioned in the outer wall of the plastic housing which enable the battery pack to be conveniently recharged. The inside surface of the battery pack usually contains two or more contacts positioned therein to enable the battery pack to be interfaced with the circuit of the cellular telephone, two-way radio, etc.

The battery pack is used as a means of providing a power source for thousands of different types of wireless devices. Along with the many fundamental components of a multi-cell battery pack, such as battery cells, circuitry, and plastic housing, contacts are used as a mechanically robust interface between the internal electric circuit of a battery pack with the device it powers and/or the charger that restores the electrical capacity of the battery pack.

A large arena of wireless devices includes cellular telephones and land mobile radios or two-way radios. Some of the trends for these devices are to reduce the size and weight of their battery pack power source. The greatest pressure from the customer in reducing the size is placed upon the thickness perimeter of the battery pack. A slimmer design provides two advantages. The first advantage is a more appealing product to the consumer and the second advantage is that additional circuitry can be added to the handset, which can be used to increase the number of features and the performance characteristics. In designing a contact, the requirements must include: (1) a contact that improves the production assembly process; (2) a very slim profile to minimize plastic thickness of the housing as well as overall battery pack thickness; (3) achieves a minimal mechanical push-out force of the contact from the plastic housing; and (4) provides a watertight seal.

Press-in contact designs are currently used in many applications. To the best of applicant's knowledge, the current press-in contact designs are only able to achieve two of the four desired performance characteristics, that is a mean push-out force requirement and watertight sealing. The disadvantages of former designs are the height or clearance required for the contact and the assembly process being very inefficient in some applications and impossible in others.

SUMMARY OF THE INVENTION

A press-in contact is disclosed which is ideally suited for use with a battery pack wherein battery cells are enclosed in a plastic housing having inner and outer walls. The outer wall of the plastic housing has a plurality of circular openings formed therein which extend therethrough. A flexible circuit having inner and outer surfaces is positioned at the inner surface of the outer wall member and has a plurality of circular openings formed therein which register with the circular openings in the outer wall of the plastic housing. The flexible circuit is provided with a circuit trace on its inner surface. Each of the openings in the flexible circuit interrupts the circuit trace on the flexible circuit. A metal tab extends across each of the openings in the flexible circuit which is electrically connected to the circuit trace for electrically connecting the otherwise interrupted circuit trace at the opening. A press-in charging contact is positioned in each of the openings in the outer wall of the plastic housing with the inner ends of the press-in charging contacts being electrically connected to the tabs through the openings formed in the flexible contact. A plurality of battery cells are positioned adjacent to the flexible circuit so as to be in electrical contact with the tabs and the flexible circuit. The inner wall of the plastic housing also has a plurality of circular openings formed therein having a press-in circuit contact positioned therein. The inner ends of the press-in circuit contacts are electrically connected to the flexible circuit.

A primary objective of the new contact of this invention is the use of a spot-welding process to connect a pre-inserted contact to the flexible board and at the same time reduce the component/material count to achieve the same performance and specific functional requirements of previous designs.

Additional objectives include optimizing the design to be as thin as possible while achieving a watertight seal and a minimum push-out separation force while allowing optimal ease of manufacturing assembly.

DESCRIPTION OF THE PREFERRED EMBODIMENT

Figure 1:
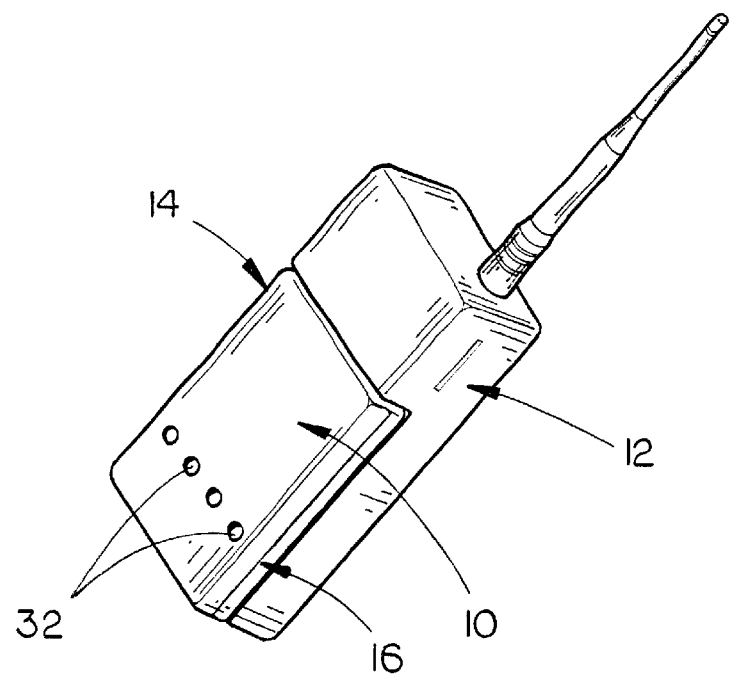
FIG. 1 is a perspective view of a battery pack mounted on a wireless communications device with the battery pack having the press-in contacts associated therewith.
Figure 2:
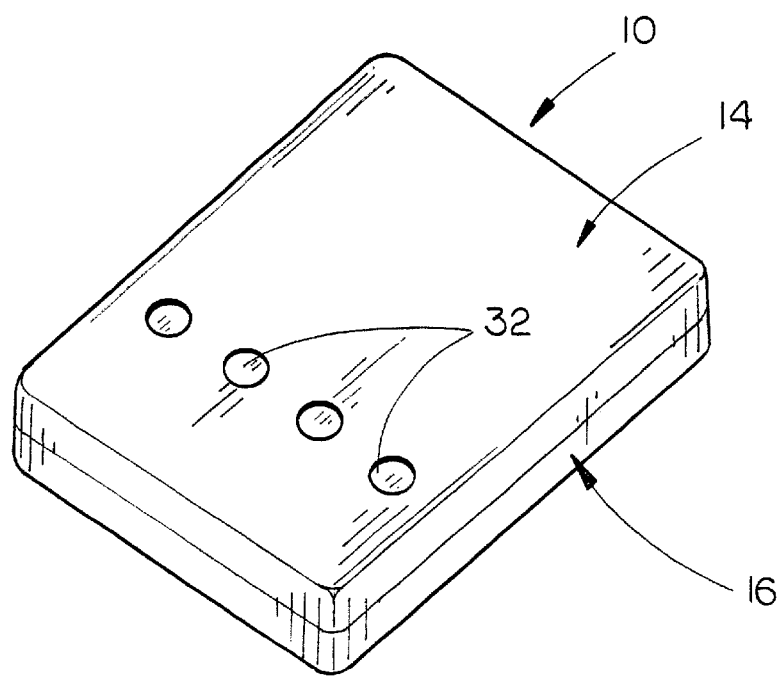
FIG. 2 is a perspective view of a battery pack having the press-in contacts of this invention associated therewith.
Figure 3:
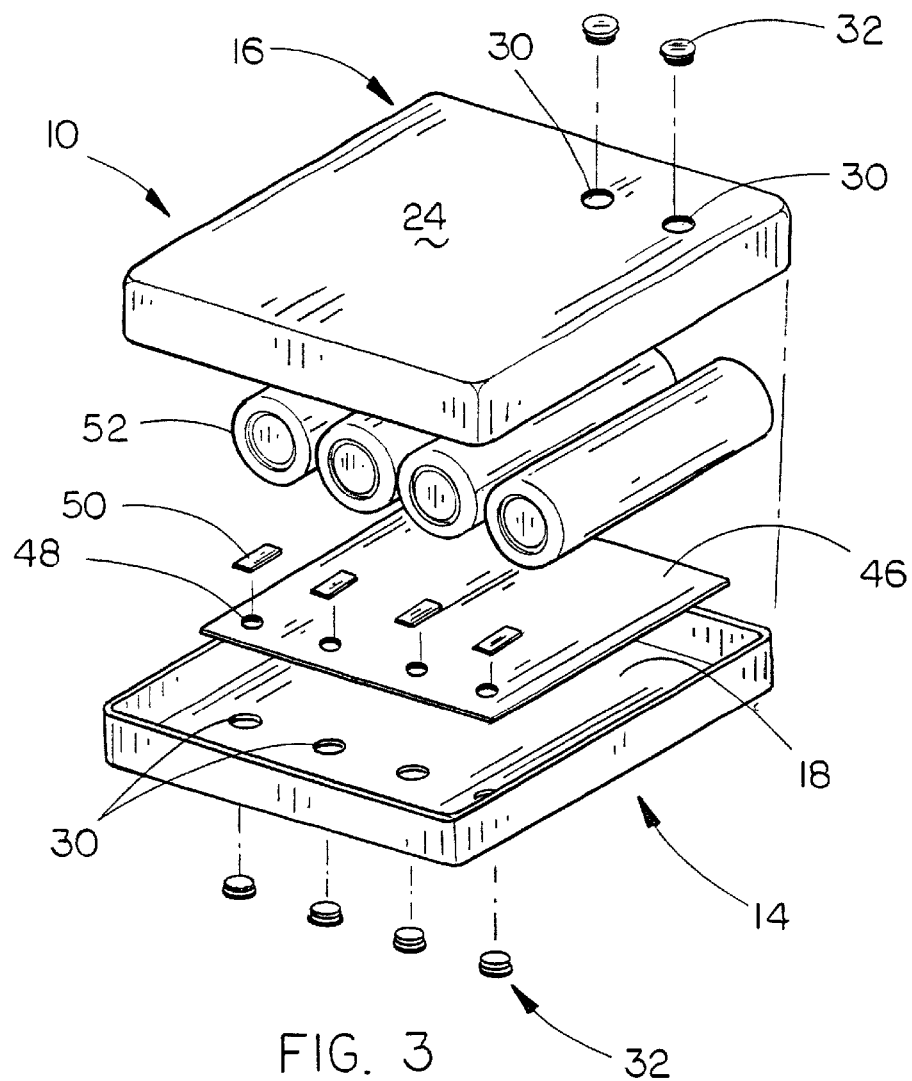
FIG. 3 is an exploded perspective view of the battery pack.
Figure 4:
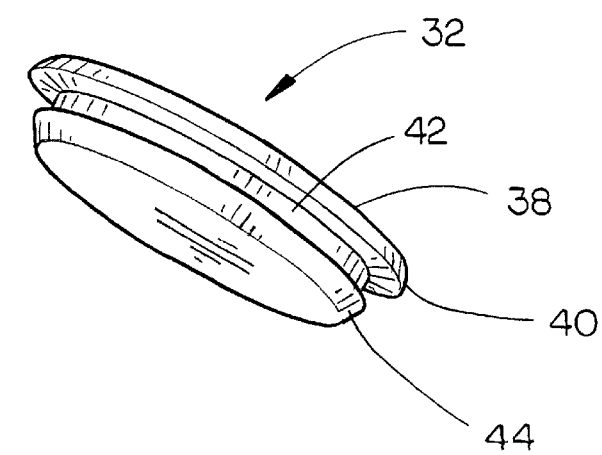
FIG. 4 is a perspective view of the press-in contact.

The numeral 10 refers generally to a battery pack which is designed for use on a two-way radio 12 or other wireless devices such as cellular telephones, etc. The battery pack normally includes a plastic housing 14 and a cover 16 preferably made of a suitable plastic material. The plastic housing 14 and the plastic cover 16 are normally secured together at their mating edges by ultrasonic welding or the like. For purposes of description, plastic housing 14 will be described as including a wall member 18 having an outer surface 20 and an inner surface 22. Similarly, plastic cover 16 will be described as including a wall member 24 having an outside surface 26 and an inner surface 28.

Wall member 18 of plastic housing 14 is provided with a plurality of circular openings 30 formed therein which are adapted to receive press-in contacts 32 therein. Wall member 24 of plastic cover 16 is also provided with a plurality of circular openings 30 formed therein adapted to receive press-in contacts 32 therein. Inasmuch as each of openings 30 are identical, only a single opening 30 will be described. Furthermore, inasmuch as each of the contacts 32 are identical, only a single contact will be described in detail. The press-in contacts 32 in wall member 18 serve as charging contacts while the press-in contacts 32 in wall member 24 serve as circuit contacts.

Figure 5:
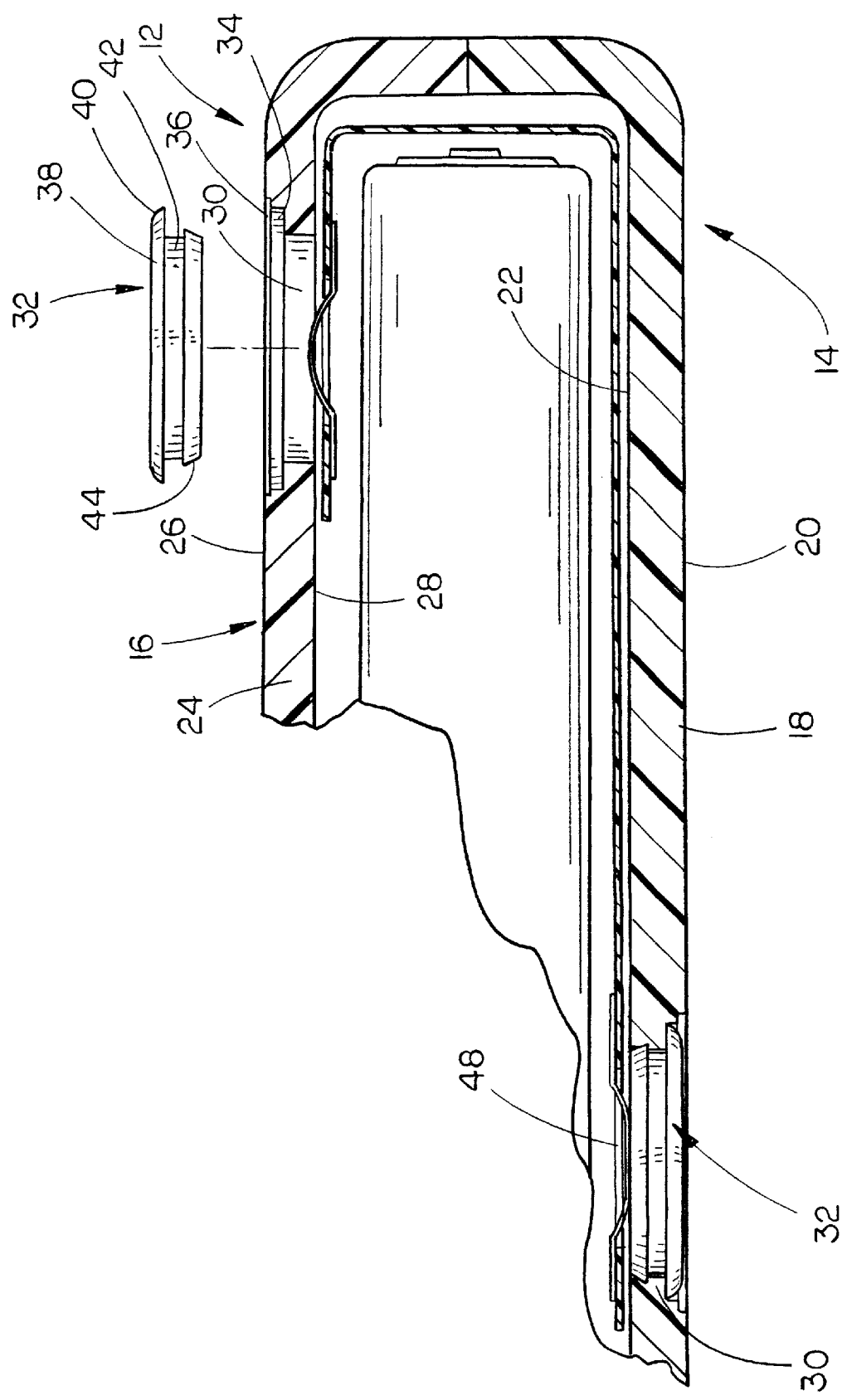
FIG. 5 is a partial sectional view illustrating the relationship of the press-in contacts with the battery pack.

As seen in FIG. 5, opening 30 is provided with a pair of countersunk portions 34 and 36. As also seen in FIG. 5, each of the contacts 32 is provided with a disc-shaped outer end portion 38 having a rounded outer edge generally indicated by the reference numeral 40. Contact 32 is provided with a reduced diameter portion 42 and a circumferential, tapered barb 44 at the inner end of the reduced diameter portion 42.

The numeral 46 refers to a flexible circuit board or flexible circuit of a generally conventional design having a circuit trace thereon. The flexible circuit board 46 is provided with a plurality of openings 48 formed therein which register with the openings 30 and wall member 18. Each of the openings 48 interrupt the circuit trace on the board 46. Metal tabs 50 are secured to the inner surface of flexible circuit board 46 and extend across each of the openings 48 to electrically connect the otherwise interrupted circuit trace at the opening 48.

The press-in contacts 32 are pressed into the openings 30, as illustrated in FIG. 5. When the press-in contacts 32 are positioned in the openings 30 in wall member 18, the outer ends of the contacts 32 are substantially flush with the outer surface of wall member 18 since the disc-shaped portion 38 is received within the countersunk portion 34 of the opening 30. When the press-in contact 32 is pressed into the opening 30 in wall member 18, the barb 44 provides the mechanical interference necessary to hold the contact in place. Further, the plastic that is displaced by the barb 44 will form very tightly around the barb 44, thereby enabling it to reject water penetration through the interface. The metal tabs 50 are then spot welded to the inner ends of the contacts 32 which are substantially flush with inside surface 22 of the wall member 18, as seen in FIG. 5. The press-in contacts 32 are then in electrical contact with the circuit trace on the flexible circuit board 46.

The battery cells 52 are then positioned on the flexible circuit board 46 in conventional fashion so that contact between the charging contacts 32 in wall member 18 and the battery cells 52 is achieved. The battery cells 52 are also electrically connected to the circuit contacts 32 in wall member 24 by any of different methods. In FIG. 5, it can be seen that the end of the flexible circuit board 46 has been wrapped around the ends of the battery cells 52 so that the circuit contacts 32 in wall member 24 are in electrical contact with the circuit trace on the flexible circuit board 46. Thus, the contacts 32 in the wall member 18 serve as the charging contacts and the contacts 32 positioned in the wall member 24 of cover 16 serve as the circuit contacts.

The press-in contacts of this invention have an extremely slim profile which utilizes at least one circumferential barb allowing the contact to be pressed into the plastic which contains the appropriate mating hole geometry. The configuration of the press-in contact provides a mechanical interference between the contact and the plastic, which produces a natural means of fixing the contact in place as well as a watertight seal. The press-in contact of this invention satisfies the fundamental design objectives without the need for additional sealing or bonding components such as O-rings, conformal coating, or RTV.

Thus it can be seen that the invention accomplishes at least all of its stated objectives.

I claim:
1. A battery pack, comprising:
a plastic housing including a wall member having inner and outer surfaces;
said wall member of said housing having a plurality of circular openings formed therein which extend therethrough;
a flexible circuit, having inner and outer surfaces, positioned at said inner surface of said wall member and having a plurality of circular openings formed therein which register with said circular openings in said wall member;
said flexible circuit having a circuit trace on its inner surface;
each of said openings in said flexible circuit interrupting said circuit trace on said flexible circuit;
a metal tab extending across each of said openings in said flexible circuit which is electrically connected to said circuit trace for electrically connecting the otherwise interrupted circuit trace at said opening in said flexible circuit;
and a press-in charging contact, having inner and outer ends, positioned in each of said openings in said wall member;
the inner ends of said press-in charging contacts being electrically connected to said metal tabs through said openings formed in said flexible circuit;
a plurality of battery cells positioned adjacent to said flexible circuit so as to be in electrical contact with said tabs and said flexible circuit;
a plastic cover, having inner and outer surfaces, enclosing said battery cells and said flexible circuit;
said plastic cover having a plurality of circular openings formed therein;
a press-in circuit contact, having inner and outer ends, positioned in each of said openings in said plastic cover for electrical connection to a circuit;
said inner ends of said press-in circuit contacts being electrically connected to said flexible circuit;
each of said press-in charging contacts having an annular barb formed therein adjacent the inner end thereof for engagement with said wall member around the opening in which the press-in charging contact is positioned;
each of said press-in circuit contacts having an annular barb formed therein adjacent the inner end thereof for engagement with said plastic cover around the opening in which the press-in circuit contact is positioned.

2. The battery pack of claim 1 wherein the outer ends of said press-in charging contacts are substantially flush with the outer surface of said wall member.

3. The battery pack of claim 1 wherein the inner ends of said press-in charging contacts are substantially flush with the inner surface of said wall member.

4. The battery pack of claim 1 wherein the inner ends of said press-in circuit contacts are substantially flush with said inner surface of said plastic cover.

5. The battery pack of claim 1 wherein the outer ends of said press-in circuit contacts are substantially flush with the outer surface of said plastic cover.

6. The battery pack of claim 4 wherein the inner ends of said press-in charging contacts are substantially flush with the inner surface of said wall member.

7. The battery pack of claim 4 wherein the outer ends of said press-in charging contacts are substantially flush with the outer surface of said wall member.

8. The battery pack of claim 1 wherein said press-in circuit contacts are substantially identical to said press-in charging contacts.

9. The battery pack of claim 1 wherein said inner ends of said press-in charging contacts are spot-welded to said metal tabs.

10. The battery pack of 9 wherein the inner ends of said press-in circuit contacts are spot-welded to said circuit trace.

11. The battery pack of claim 1 wherein each of said press-in contacts includes a disc-shaped member at its outer end, and a reduced diameter portion extending inwardly therefrom, said annular barb extending radially outwardly from said reduced diameter portion towards the outer end of the contact.

12. The battery pack of claim 11 wherein said barb has a diameter which increases from the inner end of the contact towards the outer end of the contact.

13. The battery pack of claim 11 wherein said disc-shaped member defines a tapered outer edge.

14. The battery pack of claim 11 wherein each of said openings in said wall member and said cover have enlarged diameter portions adjacent to the outer ends thereof which receive the disc-shaped members of the contacts.

15. In combination with a battery pack, including a plastic housing including a wall member having inner and outer surfaces; said wall member of said housing having a plurality of circular openings formed therein which extend therethrough; a plastic cover, having inner and outer surfaces, enclosing said battery cells and said flexible circuit; said plastic cover having a plurality of circular openings formed therein;

a flexible circuit, having inner and outer surfaces, positioned at said inner surface of said wall member and having a plurality of circular openings formed therein which register with said circular openings in said wall member;

said flexible circuit having a circuit trace on its inner surface;

each of said openings in said flexible circuit interrupting said circuit trace on said flexible circuit;

a metal tab extending across each of said openings in said flexible circuit which is electrically connected to said circuit trace for electrically connecting the otherwise interrupted circuit trace at said opening in said flexible circuit;

and a press-in charging contact, having inner and outer ends, positioned in each of said openings in said wall member;

the inner ends of said press-in charging contacts being electrically connected to said metal tabs through said openings formed in said flexible circuit;

a plurality of battery cells positioned adjacent to said flexible circuit so as to be in electrical contact with said tabs and said flexible circuit;

a press-in circuit contact, having inner and outer ends, positioned in each of said openings in said plastic cover for electrical connection to a circuit;

said inner ends of said press-in circuit contacts being electrically connected to said flexible circuit;

each of said press-in charging contacts having an annular barb formed therein adjacent the inner end thereof for engagement with said wall member around the opening in which the press-in charging contact is positioned;

each of said press-in circuit contacts having an annular barb formed therein adjacent the inner end thereof for engagement with said plastic cover around the opening in which the press-in circuit contact is positioned.

16. The combination of claim 15 wherein the outer ends of said press-in charging contacts are substantially flush with the outer surface of said wall member.

17. The combination of claim 15 wherein the inner ends of said press-in charging contacts are substantially flush with the inner surface of said wall member.

18. The combination of claim 15 wherein the inner ends of said press-in circuit contacts are substantially flush with said inner surface of said plastic cover.

19. The combination of claim 15 wherein the outer ends of said press-in circuit contacts are substantially flush with the outer surface of said plastic cover.

20. The combination of claim 18 wherein the inner ends of said press-in charging contacts are substantially flush with the inner surface of said wall member.

21. The combination of claim 18 wherein the outer ends of said press-in charging contacts are substantially flush with the outer surface of said wall member.

22. The combination of claim 15 wherein said press-in circuit contacts are substantially identical to said press-in charging contacts.

23. The combination of claim 15 wherein said inner ends of said press-in charging contacts are spot-welded to said metal tabs.

24. The combination of 23 wherein the inner ends of said press-in circuit contacts are spot-welded to said circuit trace.

25. The combination of claim 15 wherein each of said press-in contacts includes a disc-shaped member at its outer end, and a reduced diameter portion extending inwardly therefrom, said annular barb extending radially outwardly from said reduced diameter portion towards the outer end of the contact.

26. The combination of claim 25 wherein said barb has a diameter which increases from the inner end of the contact towards the outer end of the contact.

27. The combination of claim 25 wherein said disc-shaped member defines a tapered outer edge.

28. The combination of claim 25 wherein each of said openings in said wall member and said cover have enlarged diameter portions adjacent to the outer ends thereof which receive the disc-shaped members of the contacts.

29. A press-in contact having inner and outer ends for positioning in an opening formed in a plastic wall member, said contact having inner and outer ends, a disc-shaped member at said outer end, a reduced diameter portion extending inwardly from said disc-shaped member, and an annular barb extending radially outwardly from said reduced diameter portion.

* * * * *